United States Patent [19]

Ziobrowski

[11] 4,148,667

[45] Apr. 10, 1979

[54] CRYSTALLINE NICKEL CHELATE OF 1-NITROSO-2-NAPHTHOL AND PROCESS FOR PRODUCING SAME

[75] Inventor: Bernard G. Ziobrowski, Glens Falls, N.Y.

[73] Assignee: Hercules Incorporated, Wilmington, Del.

[21] Appl. No.: 853,930

[22] Filed: Nov. 22, 1977

[51] Int. Cl.$^2$ .............................................. C04B 31/00
[52] U.S. Cl. ............................ 106/288 Q; 260/439 R
[58] Field of Search ................ 260/439 R; 106/288 Q

[56] References Cited

U.S. PATENT DOCUMENTS

| | | | |
|---|---|---|---|
| 2,178,809 | 11/1939 | Rosenblatt | 260/439 R X |
| 2,259,641 | 10/1941 | Horning | 260/439 R |
| 2,726,920 | 12/1955 | Federkiel | 260/439 R X |
| 3,338,937 | 8/1967 | Inman | 260/439 R |
| 3,338,938 | 8/1967 | Matlack | 260/439 R |
| 3,751,439 | 8/1973 | Putney | 260/439 R |

*Primary Examiner*—Helen M. S. Sneed
*Attorney, Agent, or Firm*—Hazel L. Deming

[57] ABSTRACT

Pigmentary compositions comprising an anhydrous crystalline, light-stable nickel chelate of 1-nitroso-2-naphthol, from about 0.10 to 1.0 mole, per mole of the nickel chelate, of certain ester plasticizers and from about 0.05 to 1 part, per part of the anhydrous nickel chelate, of certain fatty acids and/or their salts are described. The compositions have improved texture and dispersibility characteristics and are produced by wetting the hydrated nickel chelate of 1-nitroso-2-naphthol in aqueous medium with the plasticizer and fatty acid and/or its salt, isolating the wetted product and then heating the isolated product until dehydration is complete.

10 Claims, No Drawings

CRYSTALLINE NICKEL CHELATE OF 1-NITROSO-2-NAPHTHOL AND PROCESS FOR PRODUCING SAME

This invention relates to a process for producing a crystalline, light-stable nickel chelate of 1-nitroso-2-naphthol in a form which has improved dispersibility characteristics in printing ink and lacquer vehicles and to the improved crystalline, light-stable nickel chelate composition so produced.

Crystalline, light-stable nickel chelates of 1-nitroso-2-naphthol having an X-ray diffraction pattern characterized by strongest interplanar spacings, referred to as d-spacings, at about 11.6, 9.6, 6.0, 4.9, 4.5 and 3.6 Angstroms are known and dispersions thereof with ester plasticizers are taught by R. K. Putney in U.S. Pat. No. 3,751,439 to have a softer texture and improved dispersibility as compared with the crystalline, lightstable nickel chelates produced by either C. G. Inman in U.S. Pat. No. 3,338,937 or by A. S. Matlack in U.S. Pat. No. 3,338,938. The improved crystalline, light- stable nickel chelates of 1-nitroso-2-naphthol of the Putney patent are produced by treating a hydrated nickel chelate of 1-nitroso-2-naphthol in aqueous medium with from about 0.10 to about 1.0 mole per mole of chelate of certain poly(vinyl chloride) ester plasticizers and then heating the treated chelate at about 65° to about 105° C. until the crystalline, light-stable nickel chelate is formed. The Putney compositions, however, can not be readily dispersed in nitrocellulose lacquer chip formulations or C-gravure ink systems by conventional stirring techniques and require milling to obtain satisfactory color development. Thus, the practical applications of the Putney compositions as colorants are limited to vehicle systems where milling and the heat generated thereby do not affect the system or involve safety hazards.

Now in accordance with the present invention, it has been found that the texture and dispersibility characteristics of the plasticizer-treated nickel chelate compositions produced by the Putney process can be further improved by carrying out the treatment with the plasticizer in aqueous medium in the presence of at least one fatty acid containing at least 12 carbon atoms or a water-insoluble, normally solid salt thereof.

Accordingly, the present invention is directed to an improved process for producing the crystalline, light-stable nickel chelate of 1-nitroso-2-naphthol characterized by having an X-ray diffraction pattern which exhibits strongest d-spacings at about 11.6, 9.6, 6.0, 4.9, 4.5 and 3.6 Angstroms by treating particles of a hydrated nickel chelate of 1-nitroso-2-naphthol in aqueous medium with from about 0.1 to about 1.0 mole per mole of chelate of an inert, water-immiscible poly(vinyl chloride) ester plasticizer which is a non-solvent for the nickel chelate and has a boiling point above about 200° C. until the particles are wetted, isolating the wetted product from the aqueous medium, and heating the isolated product at a temperature ranging from about 65° C. to about 105° C. until the product is dehydrated and converted to the anhydrous, crystalline, light-stable form, wherein the improvement comprises carrying out the treating step in aqueous medium which additionally contains from about 0.05 to about 1 part per part of anhydrous nickel chelate of at least one fatty acid containing at least 12 carbon atoms or a waterinsoluble, normally solid salt thereof at a pH between about 3.5 and about 5.0 and at a temperature at which the fatty acid and/or its salt and the plasticizer are liquid. The invention also relates to the improved compositions so produced. Thus, the invention provides hereto unrealized advantages in the dispersibility characteristics and texture of the crystalline, light-stable nickel chelate compositions and permits incorporation into a wide variety of vehicle systems by simple stirring techniques.

The hydrated chelate which is treated in accordance with the process of this invention can be an aqueous dispersion of the precipitated nickel chelate in the aqueous reaction medium in which the chelate is formed, can be a water-wet presscake of the precipitated chelate or, if desired, can be a washed and dried chelate which has been rewetted with water. Preferably, the hydrated chelate which is treated in aqueous medium is an aqueous suspension of the nickel chelate in the reaction medium in which it has been precipitated. Such hydrated chelates can be prepared in aqueous medium in various ways. For example, in one preferred procedure, the hydrated nickel chelate of 1-nitroso-2-naphthol is formed by nitrosating an aqueous slurry of beta-naphthol with an aqueous solution of sodium nitrite at about 40° C. in the presence of mineral acids and the nickel compound, the acid being fed slowly to an alkaline solution of the beta-naphthol to adjust the pH to about 4.0 to 4.5 and, after nitrosation is completed, increasing the temperature of the aqueous reaction medium to about 95° to 97° C. to complete chelation. Alternatively, in this procedure the nickel compound can be added to the aqueous medium after nitrosation is completed rather than prior to nitrosation. This procedure has the advantage of enabling nitrosation and chelation to be carried out in a single process step. Although the nickel compound can be added to the reaction medium at any time, i.e., before, during or after nitrosation, the nickel compound is preferably introduced after sufficient acid has been added to reduce the pH below about 6. the chelation takes place readily at room temperature or below but is ideally conducted at from room temperature up to the boiling point of the medium.

The 1-nitroso-2-naphthol used for reaction with the nickel salt can be prepared by any of the methods given in the literature for nitrosating beta-naphthol, as, for example, according to the preparations given in Beilstein's Handbuch der Organischen Chemie, 4th Ed. 7, 712 (1925), 1st Supplement, 385 (1931), 2nd Supplement, 647 (1948), Verlag von Julius Springer, Berlin, or by Marvel and Porter, Organic Syntheses, 2, 61 (1922) or by the procedure of U.S. Pat. No. 3,051,750 to Dettwyler (1962).

The amount of nickel compound used in the formation of the chelate by either of the above procedures should be sufficient to complex all of the nitroso naphthol, and preferably will not exceed the ratio of about 1.2 atoms of nickel per 2 molecules of 1-nitroso-2-naphthol.

Any nickel compound which is reactive with 1-nitroso-2-naphthol in aqueous medium can be used to produce the hydrated nickel chelate, and the nickel compound can be added to the reaction medium as a solid or as an aqueous solution. Preferred nickel compounds include such nickel salts as the sulfate, nitrate, bromide, chloride, acetate, formate and the propionate of nickel.

In accordance with this invention, particles of the hydrated nickel chelate of 1-nitroso-2-naphthol are treated in aqueous medium with from about 0.10 to about 1.0 mole of certain water-immiscible, non-volatile poly(vinyl chloride) ester plasticizers per mole of chelate and with from about 0.05 to about 1 part per part of anhydrous nickel chelate of at least one fatty acid containing at least 12 carbon atoms or a water-insoluble, normally solid salt thereof under certain conditions until the particles are wetted. The plasticizer is an inert liquid or an inert low melting solid which is non-volatile under processing conditions, is a non-solvent for the nickel chelate, is waterimmiscible and has a boiling point above about 200° C. A wide variety of ester plasticizers meet the above requirements and are suitable for use in accordance with the invention. Particularly useful are the diesters of dicarboxylic acids and saturated monohydric alcohols, pentaerythritol fatty acid esters, abietic acid esters, epoxidized fatty acid esters and phosphoric acid esters. Preferred plasticizers include the dialkyl-, diaryl- or alkyl aryl-esters of aromatic or saturated or unsaturated aliphatic dicarboxylic acids, the tetraacyl esters of pentaerythritol, the alkyl abietates, the alkyl epoxy fatty acid esters and the alkyl-, aryl-, aralkyl-, alkaryl- or alkylaryl- phosphates. Typical plasticizers include dibutylphthalate, diisooctylphthalate, dioctylphthalate, butyloctylphthalate, n-octyl-n-decylphthalate, dicyclohexylphthalate, diphenylphthalate, butylbenzylphthalate, dibutyl adipate, diisooctyl adipate, benzyloctyl adipate, di-2-ethylbutyl azelate, di-n-hexyl azelate, dibutyl fumarate, dicyclohexyl maleate, dibutyl maleate, dioctyl maleate, dibutyl itaconate, dioctyl sebacate, the pentaerythritol tetraester of mixed $C_4$ to $C_9$ acids, pentaerythritol tetrastearate, methyl abietate, hydrogenated methyl abietate, epoxidized octyl tallate, triphenyl phosphate, cresyl diphenyl phosphate, tricresyl phosphate, tridimethylphenyl phosphate, 2-ethylhexyl diphenyl phosphate, and trixenyl phosphate.

The fatty acids and/or their salts used in the practice of this invention are the water-insoluble, normally solid fatty acids containing at least 12 carbon atoms and their waterinsoluble, normally solid inorganic or organic salts. The preferred fatty acids are the saturated aliphatic monocarboxylic acids containing 12 to 24, and most preferably 16 to 20, carbon atoms and having a melting point range from about 40° to about 90° C. Typical of the preferred fatty acids are lauric, myristic, palmitic, stearic, arachidic and behenic acid. The preferred salts of the above acids are the Groups IIA, IIB, IIIA and VIII metal salts, amine salts or quaternary ammonium salts. Most preferred are the nickel, zinc, aluminum or amine salts containing at least two fatty acid moieties per salt molecule, or the monoamine salts or quaternary ammonium salts containing one fatty acid moiety and at least one long chain alkyl substituent on the nitrogen atom. The amines which form water-insoluble, normally solid organic salts with the above fatty acids are preferably aliphatic amines containing primary or secondary amine groups and at least 12 carbon atoms, or alicyclic diamines such as piperazine. Particularly useful are the aliphatic secondary amines containing a long chain alkyl substituent on a nitrogen atom and particularly a 10 to 18 carbon atom alkyl substituent. Typical amines of the above types include decylamine, cetylamine, coconut oil fatty amine, stearylamine, N-dodecyl-N-methylamine, N-stearyl-N,N-dimethylamine, N-stearylpropylenediamine, piperazine and commercial amines such as N-tallow trimethylenediamine available as Duomeen T from Armour Industrial Chemical Company and the long-chain fatty acid ester containing multiple etheramine linkages such as, for example, Sotex NC available from Synthetic Chemicals, Inc., and the like. The quaternary ammonium salts which form water-insoluble, normally solid salts with the above fatty acids are preferably quaternary monoalkyl ammonium salts wherein the alkyl substituent contains from 10 to 18 carbon atoms. Particularly preferred are lauryl pyridinium chloride and distearyldimethylammonium chloride.

Treatment of the hydrated chelate particles in aqueous medium with the plasticizer and the fatty acid and/or its salt can be carried out in any convenient manner for wetting a solid with a liquid and preferably is carried out by adding the fatty acid and/or its salt and then the plasticizer to a suspension of the chelate particles without prior separation from the aqueous medium in which the chelate was produced, at a pH within the range of about 3.5 to about 5 and at a temperature above the melting point of the plasticizer and fatty acid and/or its salt but preferably below about 100° C. The amount of plasticizer present during the treatment will range from about 0.1 to about 1.0 mole per mole of nickel chelate and preferably will be an amount ranging from about 0.15 to about 0.35, and most preferably from about 0.2 to about 0.3 mole per mole of the chelate. As stated, the treatment is also carried out in the presence of a fatty acid and/or its salt. The amount of fatty acid and/or its salt will range from about 0.05 to about 1 part and preferably from about 0.1 to about 0.5 part per part of the anhydrous nickel chelate. In a preferred embodiment, the treatment will be carried out by stirring or milling an aqueous slurry of the pigment and the fatty acid and/or its salt at a temperature ranging from about 50° to about 90° C., adding the plasticizer and continuing the stirring or milling for from about 2 to about 40 hours. If desired, the fatty acid salt can be formed in situ by adding one or both of the salt forming components as such to the aqueous medium, before, during or following formation of the nickel chelate.

The wetted product is next isolated from the aqueous medium. This can be accomplished in any known manner for separating a solid from a liquid, such as by decantation, filtration or centrifugation.

In accordance with this invention, the isolated product is heated at a temperature of from about 65° C. to about 105° C. until dehydration is complete and the product is converted to the anhydrous, crystalline, light-stable form of the nickel chelate. The time required to dehydrate and convert the product to its crystalline, light-stable form will vary, of course, depending upon the manner and conditions of heating with longer times being required at the lower temperatures. Preferably, the heating is carried out at from about 75° C. to about 105° C. for a period of time up to about 48 hours, and more preferably at from about 82° C. to about 98° C.

The compositions produced in accordance with the process of this invention are believed to be intimate dispersions containing the anhydrous, crystalline, light-stable nickel chelate of 1-nitroso-2-naphthol, from about 0.1 to about 1.0 mole per mole of the chelate of the plasticizer and from about 0.05 to about 1 part per part of the anhydrous nickel chelate of at least one fatty acid containing at least 12 carbon atoms or a waterinsoluble, normally solid salt thereof. The nickel chelate of 1-nitroso-2-naphthol is believed to contain two molecules of 1-nitroso-2-naphthol per atom of nickel and to have the probable structure illustrated by the following formulae:

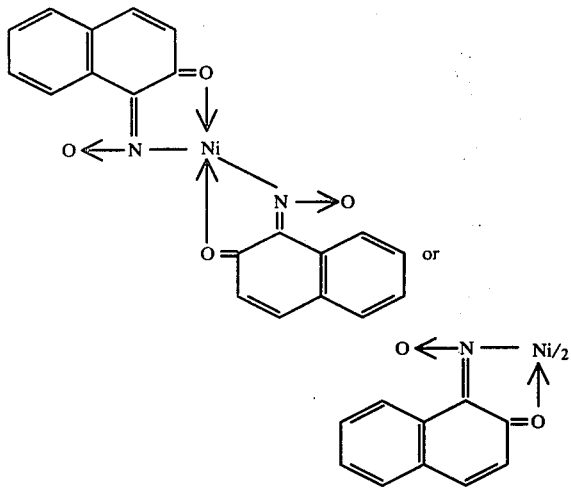

and the crystalline, light-stable form of the nickel chelate is characterized by an X-ray diffraction pattern which exhibits strongest d-spacings at about 11.6, 9.6, 6.0, 4.9, 4.5 and 3.6 Angstroms. The compositions of this invention are brown solids decomposing above 300° C., and are insoluble or only slightly soluble in water and most of the common organic solvents. In addition to exhibiting excellent light-fastness, the compositions possess high transparency, good tinctorial strength, good stability to dilute acids and alkalies, good heat stability and excellent bleed resistance in non-polar solvents and are of a soft texture and readily dispersed in C-gravure inks by stirring. They are of value as pigments in numerous applications but have particular value as pigments in inks, lacquers or plastics where they exhibit excellent light-fastness.

The invention will be illustrated by reference to the following examples in which all parts and percentages are by weight unless otherwise specified.

EXAMPLE 1

A solution of 28.4 grams (0.197 mole) of beta-naphthol dissolved in 8.3 grams of sodium hydroxide in 100 grams of water at 80° C. was stirred into 500 grams of water containing 7.1 grams of sodium formate and 4.2 grams of a long chain fatty acid ester containing multiple etheramine linkages and commercially available as Sotex NC at 25° C. The solution was diluted with water to 1100 milliliters at 25° C., after which 100 milliliters of a solution containing 12.70 grams of sulfuric acid was added slowly and uniformly with stirring over a period of 50 minutes to give an aqueous suspension of finely reprecipitated beta-naphthol at a pH of about 3.5.

A solution of 28.4 grams (0.108 mole) of nickel sulfate hexahydrate, $NiSO_4.6H_2O$, in 100 grams of water was added as rapidly as possible to the above suspension with stirring and the mixture was maintained at 25° to 30° C. with continued agitation while 150 milliliters of a solution containing 14.2 grams (0.206 mole) of sodium nitrite were added uniformly over a 90 minute period. The resulting brown slurry at a pH of 4.0 was next heated to 75° C. at a rate of 1° C. per minute and stirred for an additional hour at that temperature to complete the nitrosation and chelation steps.

Next, a slurry of 6.8 grams of powdered sodium stearate (equivalent to 0.17 part of stearic acid per part of anhydrous nickel chelate) in 35 grams of water followed by 12.0 grams of dioctylphthalate (equivalent to 0.31 mole per mole of nickel chelate) were added to the slurry and the slurry was agitated for 2 hours at 70°-75° C. and then for an additional hour in the absence of heating. The pH of the slurry was about 4.0 to 4.2. The slurry was then filtered to remove the solids, the solids were washed free of water-soluble salts and the washed solids were dried for 36 hours at 93° C. in a hot-air tray dryer oven. The dried product was 58 grams of a soft, brown pigmentary material which was easily crushed to a powder. Analyses for nickel content (10.3%) and easily volatile constituents confirmed that the product was essentially free of water of hydration and contained approximately 69% of the nickel chelate of 1-nitroso-2-naphthol, about 10% of a mixture of nickel stearate and stearic acid, and about 21% of dioctylphthalate. A volatility test carried out on pure dioctylphthalate gave negligible volatility under identical treatment conditions. The product exhibited the same X-ray diffraction pattern as the pigmentary product prepared according to Example 1 of the aforesaid Putney U.S. Pat. No. 3,751,439 (hereinafter referred to as the Putney pigment).

Light-fastness values for the pigmentary product of this example and the Putney pigment were compared on paper drawouts in a Fadeometer using inks prepared by mulling the pigments in litho varnish and then reducing the resulting dispersions with zinc white paste, the same pigment-to-vehicle ratio and same reduction being employed for each. Both pigments showed slight fading after 100 hours of exposure of the paper drawouts in a Fadeometer.

The dispersibility characteristics of the pigment of this example and the Putney pigment were evaluated in nitrocellulose lacquer and ink formulations as follows:

Nitrocellulose Lacquer—A nitrocellulose lacquer chip formulation was prepared by milling the following ingredients for 8 minutes on a 2-roll mill:
 37.5 parts of pigment (100% toner)
 47.4 parts of RS 1/4 sec. nitrocellulose
 20.0 parts of RS ½ sec. nitrocellulose
 17.5 parts of dibutylphthalate[1]
 2.6 parts of oleic acid
 30.0 parts of thinner (50:50 toluene:ethylacetate, by volume)

[1] total amount; the amount of dibutylphthalate was reduced by the amount of the dioctylphthalate present in the pigment.

An excellent dispersion was obtained with the pigment of this example and with the Putney pigment. At equal levels of nickel chelate, both gave films on foil exhibiting substantially equivalent gloss and clarity.

Nitrocellulose-Based Ink—An ink formulation was prepared by stirring 18 parts of the pigment of this example (12.4 parts of toner) for 30 minutes with a mixture of 111 parts of toluene and 30.3 parts of dioctylphthalate using a Cowles disperser and then mixing the resulting dispersion with a solution of
 101.7 parts of RS, half-second nitrocellulose
 64.2 parts of ethyl acetate
 64.2 parts of butyl acetate
 60.6 parts of butyl alcohol The resulting ink gave a Hegman gauge reading greater than 7. When the ink was thinned with an equal amount of a mixed ethyl acetate/butyl acetate/butyl alcohol solvent (1:1:1), the ink had a viscosity of 22-25 seconds (#2 Zahn Cup) and gave films on foil exhibiting superior gloss, clarity and weather fastness. When 15.4 parts of the Putney pigment (12.4 parts of toner) and 2.4 parts of dioctylphthalate were substituted for the pigment of this example, the ink gave a Hegman gauge reading of 0, and the thinned ink gave a film on foil exhibiting a dull finish which was devoid of the brightness and clarity achieved with the pigment of this example.

EXAMPLES 2-7

In these examples, the procedure of Example 1 was followed except that molecular equivalents of various fatty acids and 0.9 gram of sodium hydroxide were substituted for the 6.8 grams of sodium stearate. The type and amount of fatty acid used in each of these examples are shown in Table I below.

Table I

| Ex. No. | Fatty Acid | Amount (grams) | Product Yield (grams) |
|---|---|---|---|
| 2 | stearic acid | 6.3 | 57.3 |
| 3 | isostearic acid | 6.3 | 57.9 |
| 4 | oleic acid | 6.2 | 57.5 |
| 5 | palmitic acid | 5.7 | 56.5 |
| 6 | myristic acid | 5.1 | 56.1 |
| 7 | lauric acid | 4.4 | 55.2 |

The products of these examples exhibited the same X-ray diffraction pattern as the product of Example 1, and were soft in texture and dispersed easily by stirring in the nitrocellulosebased ink formulation of Example 1.

EXAMPLE 8

A solution of 29.5 grams (0.205 mole) of beta-naphthol dissolved in 8.2 grams of sodium hydroxide in 100 grams of water at 80° C. was stirred into 700 grams of water containing 6.6 grams of sodium acetate and 8.4 grams of sodium stearate (equivalent to 0.19 part of stearic acid per part of anhydrous nickel chelate). The solution was diluted with water to 1100 milliliters at 25° C., after which a solution of 12.55 grams of sulfuric acid in 244 grams of water was added slowly and uniformly with stirring over a period of 50 minutes to give an aqueous suspension of finely reprecipitated beta-naphthol at a pH of about 4.0 to 4.5.

A solution of 30.8 grams (0.118 mole) of nickel sulfate hexahydrate ($NiSO_4.6H_2O$) in 100 grams of water was added as rapidly as possible to the above suspension with stirring and the mixture was maintained at 25° C. with continued agitation while 14.9 grams (0.216 mole) of sodium nitrite in 300 grams of water was introduced in 2 equal portions, the first portion being added uniformly over 6 minutes and the second portion being added uniformly over the next 60 minutes. The resulting brown slurry was next heated to 95°-97° C. at the rate of 1° C. per minute and stirred for an additional hour at that temperature after which the slurry was cooled to 60° C. by dilution with cold water.

Next 11.4 grams of dioctylphthalate (equivalent to 0.29 mole per mole of nickel chelate) were added to the slurry and the slurry was agitated at 50°-60° C. for four hours. The slurry was then filtered to remove the solids, the solids were washed free of water-soluble sulfates and the washed solids were dried for 48 hours at 82° C. in a hot-air tray dryer oven. The dried product was 58.2 grams of reddish-brown pigmentary material which was easily crushed to a fine powder and which exhibited the same X-ray diffraction pattern as the product of Example 1. A comparison of the film properties and lightfastness obtained with C-gravure inks containing the product of this example and the pigment prepared according to Example 1 of the aforesaid Putney patent U.S. Pat. No. 3,751,439 except that the amount of dioctylphthalate was increased to 11.4 grams showed that the product of this example produced on shellac-coated aluminum foil a colored film of excellent lightfastness and much higher gloss and clairty. The inks for this test were prepared by ball milling the following ingredients for 48 hours in a pint can at ambient temperature and then thinning 100 grams of the resulting ink with 40 milliliters of a mixed ethyl acetate/n-butyl acetate/n-butanol solvent (1:1:1, by volume):

1000 grams of ⅜ inch steel balls
6.1 grams of pigment (100% toner)
7.8 grams of dioctylphthalate[1]
13.6 grams of RS ½ sec. nitrocellulose containing 30% ethanol
16.0 grams of n-butanol
17.5 grams of ethyl acetate
17.4 grams of n-butyl acetate
50.2 grams of toluene (1) Total amount; the amount of dioctylphthalate was reduced by the amount of dioctylphthalate present in the pigment.

EXAMPLE 9

The procedure of Example 8 was repeated except that 3.3 grams of N-tallow-3-amino-n-propylamine were substituted for the 8.4 grams of sodium stearate, the amount of nickel sulfate was reduced to 27.5 grams and 5.7 grams of powdered sodium stearate (equivalent to 0.14 part of stearic acid per part of anhydrous nickel chelate) were added to the cooled slurry prior to the addition of the dioctylphthalate. The product of this example (58.1 grams) exhibited the same X-ray diffraction pattern as the product of Example 1. When the product was evaluated in C-gravure ink according to the procedure of Example 8, the lightfastness was excellent and the ink gave a film which exhibited slightly higher gloss and clarity than the ink containing the product of Example 8.

EXAMPLE 10

The procedure of Example 9 was repeated except that 3.3 grams of Sotex NC were substituted for the 3.3 grams of the amine of Example 9. The product of this example exhibited properties similar to that of Example 9 and gave a film on foil with slightly better gloss and clarity than the product of Example 9.

EXAMPLE 11

The procedure of Example 9 was repeated except that 8.0 grams of a 75% aqueous solution of distearyl dimethylammonium chloride were substituted for the 3.3 grams of the amine of Example 9 and the amount of sodium stearate added was decreased to 3.2 grams. The product (57.7 grams) exhibited the same X-ray diffraction pattern as the product of Example 1 and gave a film which exhibited excellent lightfastness and improved gloss and clarity as compared with the products of Examples 8, 9 and 10 in C-gravure inks prepared according to the procedure of Example 8.

EXAMPLE 12

The procedure recited in the first two paragraphs of Example 8 was repeated with the exceptions that 1.4 grams of the sodium salt of condensed naphthalene sulfonic acid was substituted for the 8.4 grams of sodium stearate, the amount of nickel sulfate used was 27.5 grams (0.105 mole) and the nitrosation and chelation were carried out at 40° C. instead of 25° C.

The diluted brown slurry at 60° C. was filtered and washed free of salts and the resulting filter cake was reslurried in 3000 grams of water at 55° C. Next, 6.8 grams of sodium stearate, 3.2 grams of nickel sulfate hexahydrate dissolved in 12 grams of water and 12.0 grams of dioctylphthalate were added to the slurry and the mixture was agitated for 4 hours at 50°–55° C., following which the mixture was filtered to remove the solids and the solids were recovered as in Example 8. The dired product was 58.3 grams of a reddish-brown pigmentary material which was easily crushed to a soft powder. Analysis for nickel (10.9%) and the X-ray diffraction pattern indicated that the product contained about 69% of the crystalline nickel chelate of 1-nitroso-2-naphthol. The product exhibited good light-fastness properties when exposed in a Fadeometer for 100 hours and had good dispersibility characteristics.

EXAMPLE 13

The procedure set forth in paragraphs 1 and 2 of Example 8 was repeated except that 27.5 grams (0.105 mole) of nickel sulfate were used and the beta-naphthol reprecipitation, nitrosation and chelation were carried out at 40° C. instead of 25° C. Next, 4.6 grams of dioctylphthalate (equivalent to 0.11 mole per mole of nickel chelate) and 16.7 grams of zinc stearate (equivalent to 0.40 part per part of anhydrous nickel chelate) were added to the slurry and the slurry was agitated at 50°–55° C. for 4 hours. The slurry was then filtered to remove the solids, the solids were washed free of water-soluble salts and the washed solids were dried for 48 hours at 82° C. in a hot-air tray drier oven.

The product of this example (62.5 grams) exhibited the same X-ray diffraction pattern and lightfastness properties as the product of Example 1. When the product was evaluated in C-gravure ink according to the procedure of Example 8, the film gloss and clarity indicated that the dispersibility characteristics of the product were good.

What I claim and desire to protect by Letters Patent is:

1. In a process for producing a pigmentary composition comprising a crystalline, light-stable nickel chelate of 1-nitroso-2-naphthol characterized by having an X-ray diffraction pattern which exhibits strongest d-spacings at about 11.6, 9.6, 6.0, 4.9, 4.5 and 3.6 Angstroms by treating particles of a hydrated nickel chelate of 1-nitroso-2-naphthol in aqueous medium with from about 0.10 to about 1.0 mole per mole of chelate of an inert, water-immiscible, poly(vinyl chloride) ester plasticizer which is a non-solvent for the nickel chelate and has a boiling point above about 200° C. until the particles are wetted, isolating the wetted product from the aqueous medium, and then heating the isolated product at a temperature ranging from about 65° C. to about 105° C. until the product is dehydrated and converted to the anhydrous, crystalline, light-stable form, the improvement which comprises carrying out the treatment step in aqueous medium which additionally contains from about 0.05 to about 1 part per part of anhydrous nickel chelate of at least one fatty acid containing at least 12 carbon atoms or a water-insoluble, normally solid salt thereof at a pH between about 3.5 and 5.0 and at a temperature at which the fatty acid and/or its salt and the plasticizer are liquid.

2. The process of claim 1 wherein the hydrated nickel chelate is in the form of presscake.

3. The process of claim 1 wherein the aqueous medium is the aqueous reaction medium in which the hydrated nickel chelate is formed.

4. The process of claim 3 wherein the salt is a nickel, zinc, aluminum or amine salt containing at least 2 fatty acid residues, or a monoamine salt or quaternary ammonium salt containing one fatty acid residue and at least one long chain alkyl substituent on the nitrogen atom.

5. The process of claim 4 wherein the fatty acid is stearic acid and the plasticizer is a diester of phthalic acid.

6. A pigmentary composition comprising an anhydrous, crystalline, light-stable nickel chelate of 1-nitroso-2-naphthol characterized by having an X-ray diffraction pattern which exhibits strongest d-spacings at about 11.6, 9.6, 6.0, 4.9, 4.5 and 3.6 Angstroms, from about 0.10 to about 1.0 mole per mole of the nickel chelate of an inert, water-immiscible, poly(vinyl chloride) ester plasticizer which is a non-solvent for the nickel chelate and has a boiling point above about 200° C., and from about 0.05 to about 1 part per part of anhydrous nickel chelate of at least one fatty acid containing at least 12 carbon atoms or a water-insoluble, normally solid salt thereof.

7. The composition of claim 6 wherein the salt is a nickel, zinc, aluminum or amine salt containing at least 2 fatty acid residues, or a monoamine salt or quaternary ammonium salt containing one fatty acid residue and at least one long chain alkyl substituent on the nitrogen atom.

8. The composition of claim 7 wherein the fatty acid is stearic acid.

9. The composition of claim 8 wherein the salt is an amine salt.

10. The composition of claim 8 wherein the salt is nickel stearate.

* * * * *